United States Patent [19]

Tomizawa et al.

[11] 4,224,056
[45] Sep. 23, 1980

[54] DIRECT REDUCTION PROCESS FOR IRON ORES WITH FLUIDIZED BED SYSTEM

[75] Inventors: Fumio Tomizawa, Yokohama; Kazuo Sezaki, Funabashi; Makoto Shimizu, Yokosuka; Yukinaga Katahashi, Yokohama, all of Japan

[73] Assignee: Ishikawajima-Harima Jukogyo Kabushiki Kaisha, Tokyo, Japan

[21] Appl. No.: 965,211

[22] Filed: Nov. 30, 1978

[30] Foreign Application Priority Data

May 24, 1978 [JP] Japan .................................. 53/62027

[51] Int. Cl.² ............................................ C21B 13/12
[52] U.S. Cl. .......................................... 75/11; 75/26; 75/36; 75/35
[58] Field of Search ...................... 75/11, 26, 33–38

[56] References Cited

U.S. PATENT DOCUMENTS

| | | | |
|---|---|---|---|
| 2,742,354 | 4/1956 | Ogorzaly | 75/26 |
| 2,978,315 | 4/1961 | Schenck et al. | 75/26 |
| 3,948,645 | 4/1976 | Elvander et al. | 75/26 |
| 4,082,543 | 4/1978 | Beggs et al. | 75/26 X |
| 4,084,958 | 4/1978 | Collin et al. | 75/26 |

Primary Examiner—M. J. Andrews
Attorney, Agent, or Firm—Sughrue, Rothwell, Mion, Zinn and Macpeak

[57] ABSTRACT

In a reactor, fine iron ore solids are made to descend through the fluidized bed of fine carbon bearing particles sustained within the reactor so that the fine iron ore solids may be reduced and simultaneously the reducing gas may be produced. The direct reduction efficiency may be considerably improved.

9 Claims, 11 Drawing Figures

DIRECT REDUCTION PROCESS FOR IRON ORES WITH FLUIDIZED BED SYSTEM

DETAILED DESCRIPTION OF THE INVENTION

The present invention relates to a process for reducing the iron ores with a fluidized bed system and more particularly a process for reducing the iron ores while simultaneously producing the reducing gas.

The prior art shaft type direct reduction processes of the iron ores using gas reductant have the following features.

(I) The apparatus for generating or reforming the reducing gas and the reactor or reaction vessel in which the iron ores are subjected to the direct reduction are installed separately. As a result, the installation cost of the facilities is high.

(II) The reducing gas generated by the reducing gas generator is blown into the reactor from the bottom thereof and is made to ascend while the materials (to be referred to as "the fine ore solids" including iron ores, pellets and so on) are made to descend as counterflow for the reducing gas. As a result, at the charging stages of the reduction process, the fine ore solids cannot be made into contact with the rich reducing gas to a satisfactory degree so that effective and efficient reduction will not occur throughout the reactor.

(III) Since the reducing gas is used to reduce the fine ore solids, the reduced or metallized iron ores are pressed against each other under the pressure, sintered, clustered and agglomerated. As a result, the ventilation to the reducing gas within the reactor is degraded and consequently the quality of the reduced iron ores is also degraded. Furthermore, the discharge or extraction of the reduced iron ores from the reactor becomes difficult.

In the solid-reductant direct reduction processes wherein a rotary kiln is used, the mixture of iron ores and crushed coal (solid-reductant) is charged into the kiln (reactor) and heated. Because of the insufficient amount of gas between the iron ores and crushed coal, the reduction rate is slow.

The inventors made extensive studies and experiments in order to overcome the above and other problems encountered in the prior art direct reduction process for the iron ores and succeeded in providing novel direct reduction processes for iron ores with a fluidized bed system.

One of the objects of the present invention is therefore to provide a direct reduction process for the iron ores with a fluidized bed system, wherein the reducing gas is produced while the reduction of the iron ores proceeds simultaneously in the same reactor vessel, whereby the contact between the iron ores and reducing gas is enormous and consequently the reduction efficiency may be remarkably improved while the reduction cost may be considerably reduced.

Another object of the present invention is to provide a direct reduction process for the iron ores with a fluidized bed system so that the reducing gas may be produced continuously or intermittently within the reactor so that the continuous reduction of the iron ores may be accomplished.

A further object of the present invention is to provide a direct reduction process for the iron ores with a fluidized bed system which may attain satisfactory reactions between the iron ores and reducing gas even for charged iron ores.

A still further object of the present invention is to provide a direct reduction process for the iron ores wherein the fine carbon bearing particles are fluidized by the fluidizing gas so as to form the fluidized bed of the fine carbon bearing particles in the reactor, thereby preventing the agglomeration and sintering of the iron ores during the reduction process.

A yet another object of the present invention is to provide a direct reduction process for the iron ores with a fluidized bed system which may facilitate the automatic separation of the reduced or metallized iron ores from the fine carbon bearing particles based on the difference in specific gravity and size between them. Except those which have been consumed, the fine carbon bearing particles are floating in the reactor so that the reduced or metallized iron ores may be easily extracted with small amount of char and dust.

To the above and other ends, the inventors made extensive studies and experiments and found out that the above and other problems encountered in the prior art direct reduction process for the iron ores may be substantially overcome by causing the fine carbon bearing particles to float in the heated gaseous atmosphere (containing at least fine carbon bearing particles in the fluidized bed to be described in detail below and the carbon monoxide and causing the fine ore solids to descend through the fluidized bed, referred to as "the reducing atmosphere"), and descending the fine ore solids through the floating layer, thereby causing the reduction of the iron ores by the fine carbon bearing particles in the fluidized bed and in the reducing atmosphere containing the carbon monoxide while simultaneously reacting the carbon dioxide produced by the reduction of the iron ores with the carbon bearing particles so as to regenerate the reducing atmosphere containing the carbon monoxide. The present invention is therefore based upon the above observed facts.

The present invention will become more apparent from the following description of some examples (embodiments in this specification) thereof taken in conjunction with the accompanying drawings, in which.

Figure 1:
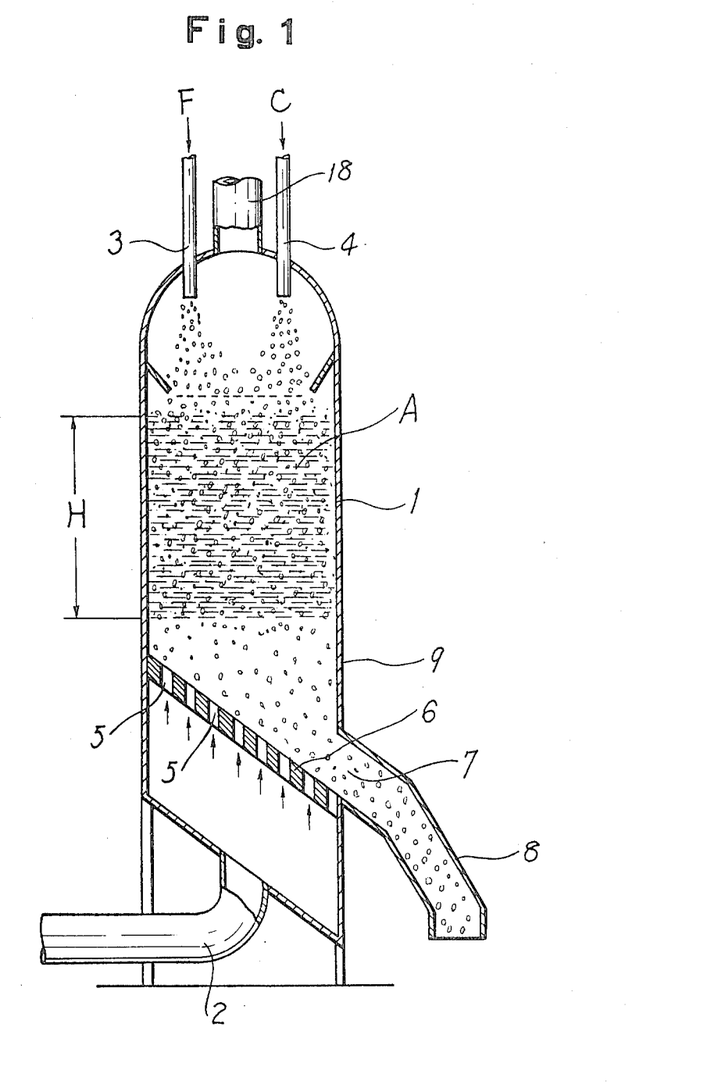
FIG. 1 is a schematic vertical sectional view of a reactor used in carrying out a first example (embodiment) of the present invention.
Figure 2:
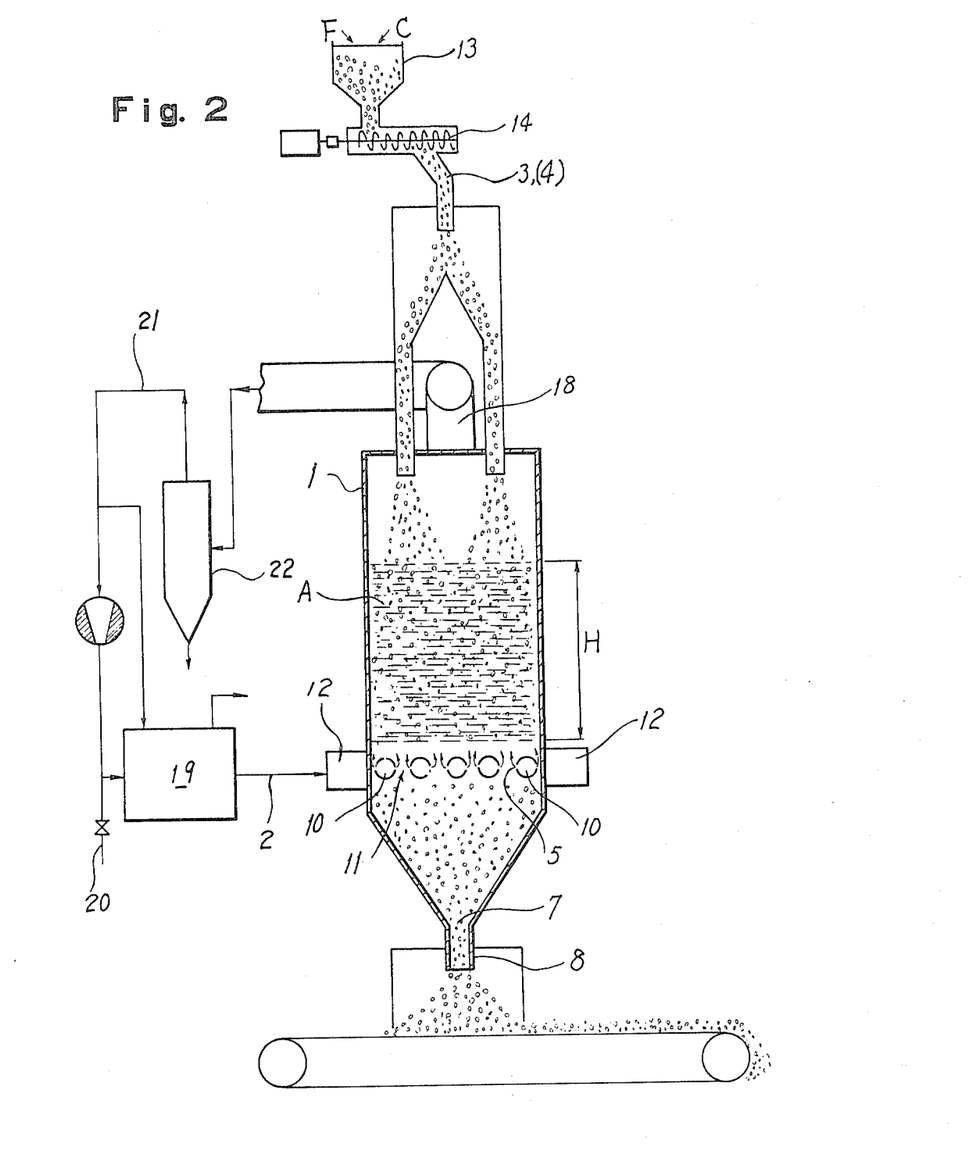
FIGS. 2 and 3 show schematically the fluidized bed systems, respectively, used for carrying out modifications of the first example (embodiment)
Figure 3:
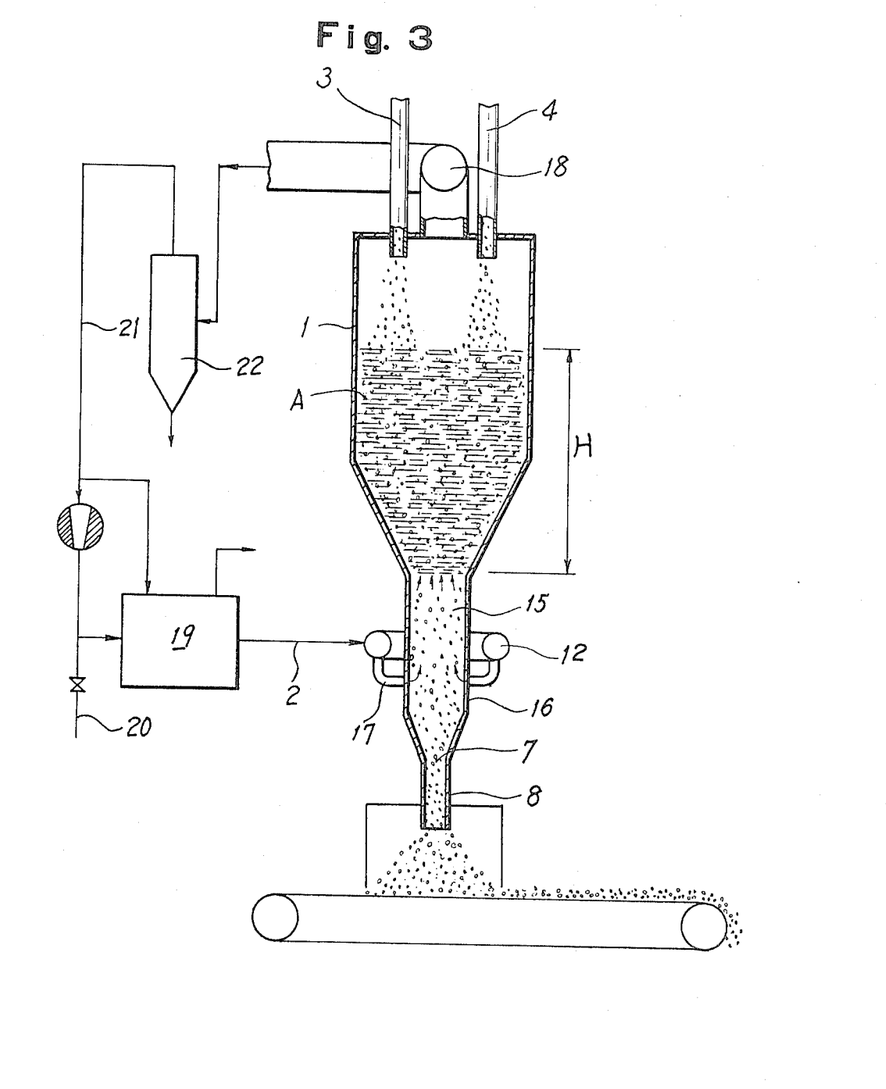

FIRST EMBODIMENT AND ITS MODIFICATIONS, FIGS. 1-3

Referring to FIG. 1, the fine iron ore solids F (including iron ores, oxidized pellets, dust, sintered ores and so on) are charged into a reactor 1 through an iron ore charge inlet 3 while the fine carbon bearing particle C are charged through a carbon bearing particle charge inlet 4. Alternatively, both the fine ore solids F and the fine carbon bearing particles C may be charged through either of the inlets 3 or 4, and when the mixture of the fine ore solids F and the fine carbon bearing particles C is charged into the reactor 1 as will be described below, one inlet may be used.

A gas for sustaning a fluidized bed in the reactor 1 is introduced through a gas inlet 2 and gas distribution holes 5 in a gas distributor and deck 6 into a fluidized-bed portion. The gas distributor and deck 6 is inclined at an angle relative to the axis or the vertical axis of the reactor 1. The lower end of the gas distributor and deck 6 is communicated through a product discharge outlet 7 formed through the reactor wall 9 with a chute 8.

In a first modification of the first embodiment shown in FIG. 2, instead of the inclined gas distributor and deck 6, gas distribution pipes 10 each formed with a plurality of gas distribution holes 5 are arranged in the form of grid 11, and a fluidizing gas is distributed into these gas distribution pipes 10 from an annular pipe 12 which is disposed so as to surround the reactor 1 and communicated with the gas inlet 2. The grid 11 consisting of the gas distribution pipes 10 are maintained horizontal, but it is to be understood that the gas distribution pipes 10 may be so arranged as to become concave upward or downward.

The fine ore solids which have been reduced drop through the spaces between the gas distribution pipes 10 and through the product discharge outlet 7 and chute 8 contiguous therewith into a conveyor.

The fine ore solids F and the fine carbon bearing particles C are charged into a common hopper 13 and then therefrom charged into the reactor 1 through a charging passage incorporating therein a screw conveyor 14 and the charge inlet 3 or 4.

A second modification shown in FIG. 3 of the first embodiment has an open-bottom reactor 1 as is the case of the first modification. Furthermore, it consists of a large diameter cylindrical section, an inverted frustoconical section, and a reduced diameter cylindrical section or windbox 16 which defines a restricted passage 15. A fluidizing gas is distributed into the passage 15 by tuyere nozzles 17 around the sides 16 of the reactor vessel 1 so that the gas distributor and deck 6 or 11 may be eliminated.

Next the direct reduction process of the iron ores with the fluidizing reactor of the above types will be described. The exhaust gas consisting of reducing gas or carbon monoxide (CO), carbon dioxide ($CO_2$) and other gases and entrained solids is discharged through an exhaust gas outlet 18 at the top of the reaction vessel 1 and is introduced into a scrubber or dust separator 22. After the entrained solids have been separated in the dust separator 22, the exhaust gas flows through a gas circulation line 21 into a heater 19. After the gas is heated to a desired temperature, it is charged through the gas charging inlet 2 into the reactor 1 at such a rate of flow as to sustain the fluidized bed in the reactor 1. In order to control the carbon contents in the reduced or metallized solids, air or a gas composed of oxygen and nitrogen is supplied through an inlet 20 into the gas circulation line 21.

When the direct reduction process is started, no waste or exhaust gas is available so that the air or oxygen is introduced in the gas circulation line or system 21 to perform partial combustion of the carbon bearing particles that are forming a fluidized bed A and recycled until the content of the fluidizing and reducing gas may be suitably proportioned before the fine ore solids are charged into the reactor 1. The fluidizing and reducing gas is distributed through the openings 5 of the deck 6 or the gas distribution pipes 10 into the desired pattern and flows upward under the controlled rate of flow and temperature so as to sustain the fluidized bed of a desired height. The gas leaving the fluidized bed A flows through the exhaust outlet 18 at the top of the reactor 1 into the scrubber 22 and is recirculated in the manner described above. Almost all of the steam in the exhaust gas is removed by the scrubber 22.

The upflow of the fluidizing and reducing gas distributed through the openings 5 fluidizes the fine carbon bearing particles C charged into the reactor 1, whereby the fluidized bed A of the fine carbon bearing particles C of the height of H may be maintained. In the flow of the fluidizing gas, the condition called normal fluidization may exist in which the fine carbon bearing particles seem boiling in the fluidized bed A. The fine ore solids F pass through the fluidized bed A and are subjected to the following reactions:

| | |
|---|---|
| $Fe_2O_3 + 3\ CO = 2\ Fe + 3CO_2$ | (I) |
| $Fe_2O_3 + 3\ C = 2\ Fe + 3CO$ | (II) |
| $C + CO_2 = 2\ CO$ | (III) |

That is, the fine ore solids ($Fe_2O_3$) react with carbon monoxide (CO) or the gaseous reductant in the fluidizing and reducing gas at an elevated temperature so that iron (Fe) and carbon dioxide ($CO_2$) are produced. The carbon dioxide ($CO_2$) then reacts with the fine carbon bearing particles (C) to be converted into the carbon monoxide (CO) as shown in Eq. (III). The reduction (II) with the solid reductants proceeds simultaneously.

While the fine ore solids F pass through the fluidized bed A, the new fine carbon bearing particles C are charged at a suitable rate so that the reductions (I) and (II) may continuously proceed simultaneously, producing the metallized fine ore solids and the reducing gas or CO. Since the fine carbon bearing particles C are consumed in these reduction processes, they must be supplemented at a suitable rate as described above.

The mixture of the fine ore solids and the fine carbon bearing particles may be charged simultaneously into the reactor 1 as described above. In this case, because of the difference in specific gravity between them, the fine carbon bearing particles C are fludized and the fine ore solids F pass through the fluidized bed A thus formed.

Part of the fine carbon bearing particles C are inevitably entrained in the reduced or metallized fine ore solids discharged out of the reactor 1. They may be separated and re-charged into the reactor 1.

In addition to the introduction of the air or the oxygen through the inlet 20 into the gas recirculation system 21 at the charging stage of the direct-reduction process, it may be charged even during the operation so as to control the content of the fluidizing gas to be charged into the reactor 1. Furthermore, in addition to the air or the oxygen, the reducing agent (such as $H_2$, CO, methane and so on), the nitrogen gas and any other suitable gases may be charged in order to control the contents of the fluidizing gases circulated through the reactor 1.

In this specification, the term "the fluidized bed" refers to the layer in the reactor 1 in which fine solids (that is, fine carbon bearing particles) are fluidized. It may cover the term "the boiling bed".

The gases produced in the reactor are exhausted from the top of the reactor 1 and recirculated into it so that the reaction temperature may be maintained at a predetermined level and the fluidized bed A of fine carbon bearing particles may be maintained in the reactor 1.

When the fluidized bed A is formed and maintained in the manner described above, the fine ore solids which are charged into the reactor 1 may be caused to directly contact with the reducing gas throughout the reactor so that the effective and efficient reduction of the iron ores may proceed. When the fine ore solids descend through the fluidized bed of the fine carbon bearing particles, the reduction of the fine iron ore solids proceeds so that the metallized ores may be obtained. In this case, the fine carbon bearing particles serve as members which prevent the agglomeration of the fine ore solids under pressure and the sintering thereof. Most of the fine carbon bearing particles which are the solid reductants are always maintained in the fluidized bed. Because of the difference both in the specific gravity and size between the fine ore solids and the fine carbon bearing particles, they may be automatically and roughly separated from each other so that only the reduced or metallized iron ores may be discharged out of the reactor. Some carbon bearing particles entrained in the discharged products may be easily separated by the magnetic separators.

The reduced iron ores are discharged to the exterior in either of the following manners. One is the cooling and discharge system wherein the reduced iron ores are cooled substantially to room temperature so as to prevent reoxidization, and then are discharged. In the other manner, the reduced iron ores are discharged while being hot and are separated from the char and the ash under an atmosphere non-active for reoxidization. After separation, the reduced iron ores are briquetted by a briquetting machine or are agglomerated by other facilities. These cooling and agglomerating facilities are not shown in FIGS. 1-3.

SECOND EMBODIMENT, FIGS. 4-7

In the second embodiment, electrodes are inserted into the fluidized bed of the fine carbon bearing particles and energized so that the Joule heat may be produced and transmitted to the fluidized bed A.

Figure 4:
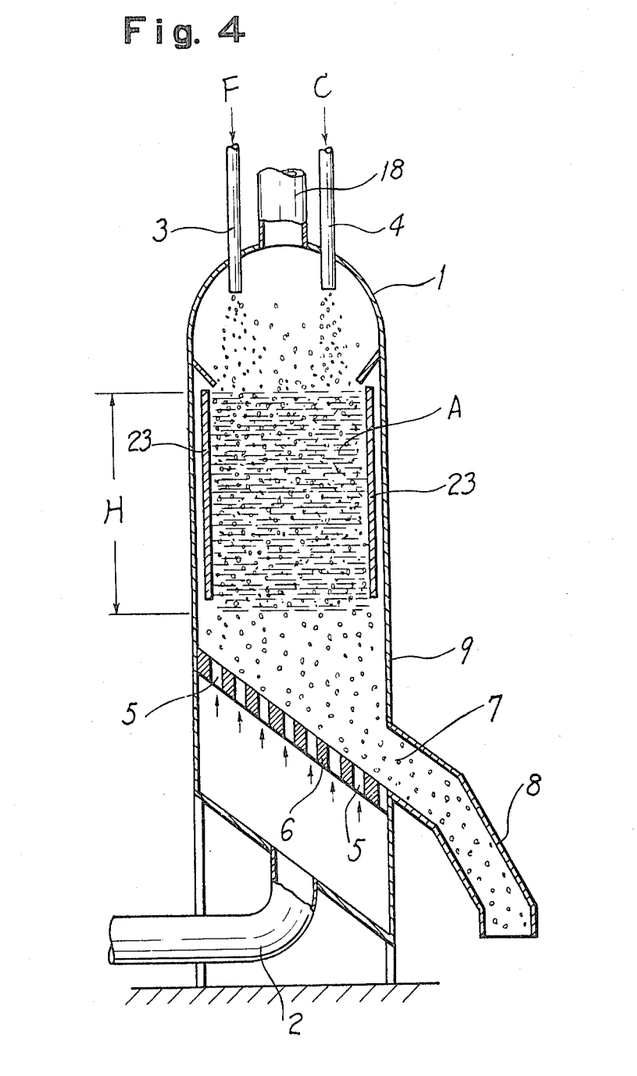
FIG. 4 is a schematic vertical sectional view of a reactor used in carrying out a second example (embodiment) of the present invention.

Referring to FIG. 4, the reactor 1 is similar in construction to that shown in FIG. 1 except that pairs of electrodes 23 are disposed within the reactor 1 and spaced apart from the inside wall surfaces thereof by a desired distance. The electrodes 23 of each pair are disposed in opposed relationship.

Figure 6:
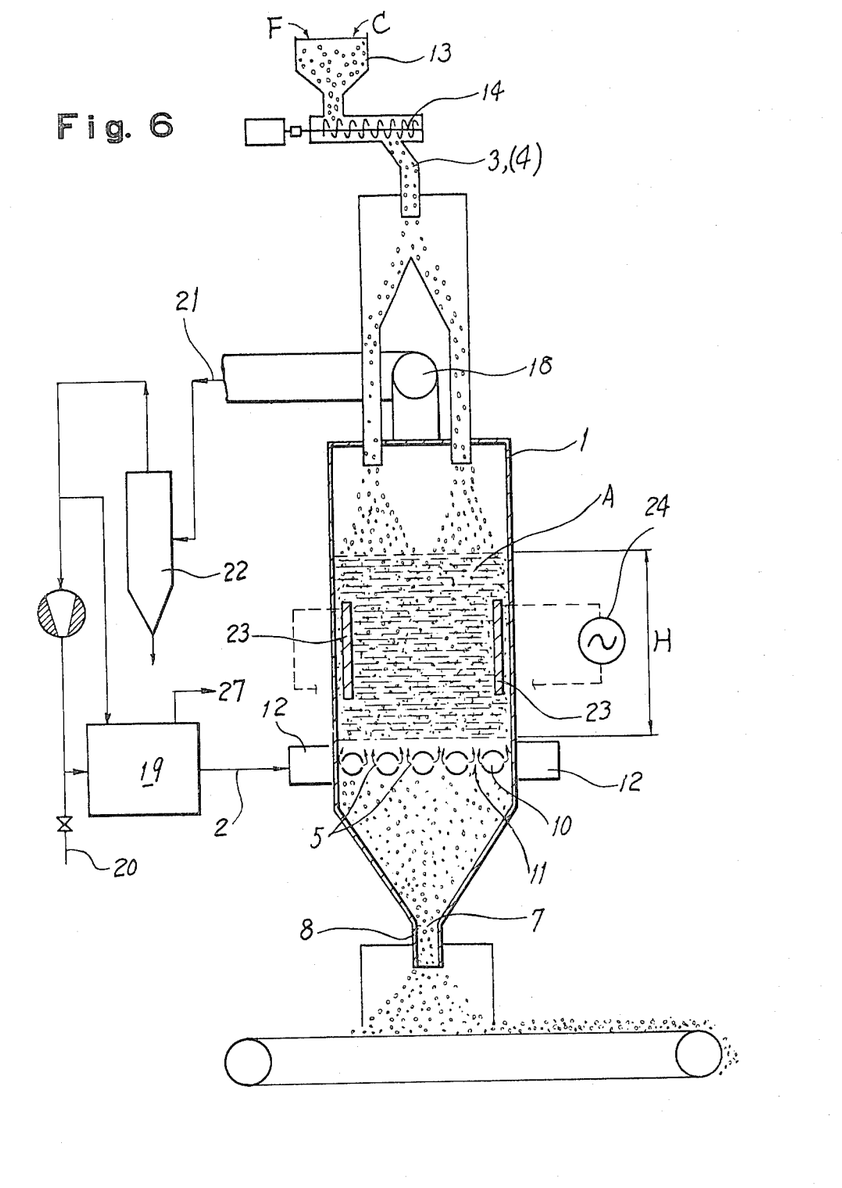
FIG. 6 is a schematic vertical sectional view of a reactor and a diagrammatic view of components associated thereto for carrying out a modification of the second example (embodiment)

The reactor 1 shown in FIG. 6 is similar in construction to that shown in FIG. 2 except that pairs of electrodes 23 are disposed, in the manner described above with reference to FIG. 4, above the gas distribution pipes 10 arranged in the form of the grids 11.

Figure 7:
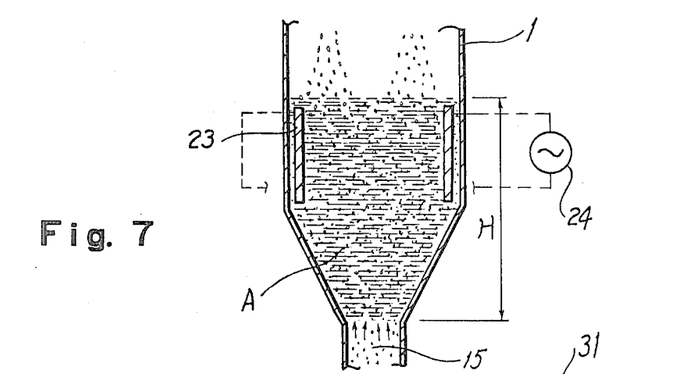
FIG. 7 is a schematic, fragmentary vertical sectional view of a reactor used in carrying out another modification of the second example (embodiment)

The reactor 11 shown in FIG. 7 is similar in construction to that shown in FIG. 3 except that pairs of electrodes 23 are disposed in the enlarged cylindrical shell section above the restricted passage 15 in the manner described above.

The shape of the electrodes 23 is determined depending upon the conductivity of the fluidized bed of the fine carbon bearing particles and on the upflow pattern of the fluidizing gas. In general, they are flat.

In the reactor 1 with the electrodes 23, the fluidized bed A of the fine carbon bearing particles is created and sustained in the manner described above. Thereafter the voltage is applied across the pair of electrodes 23 the current flows through the fluidized bed A so that the temperature in the reactor 1 rises due to the Joule heat. As the fine ore solids descend through the fluidized bed A, they are reduced and the reducing gas is produced in the manner described above.

Figure 5:
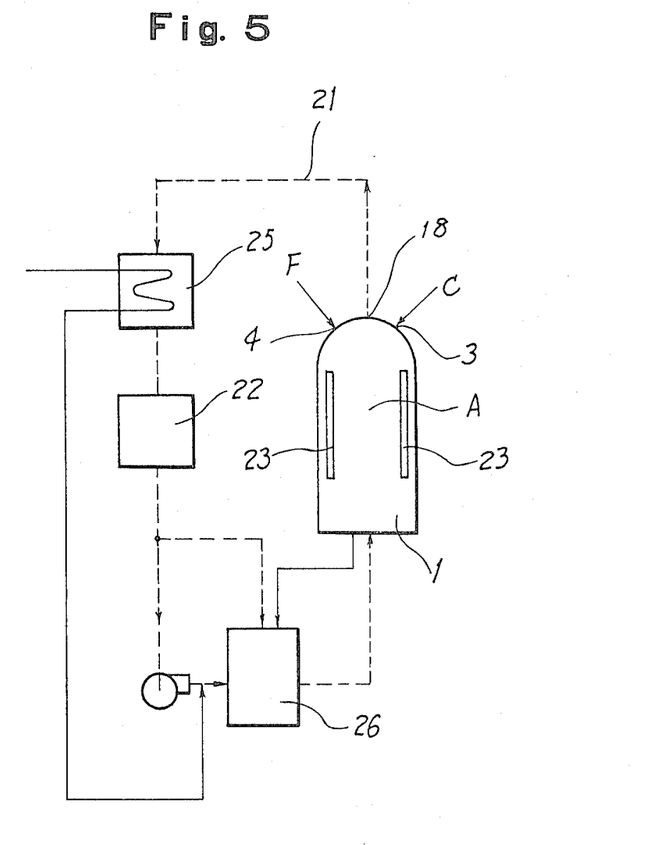
FIG. 5 is a diagrammatic view of a system used for carrying out the second example (embodiment)

The gas discharged from the top of the reactor 1 is cooled in a heat exchanger 25 (see FIG. 5). The exhaust gas is discharged through an outlet 27 (See FIG. 6) of a preheater 26 to the exterior.

As the first embodiment, the second embodiment may attain the desired effects of the present invention. Furthermore, since the electrodes 23 are energized to pass the current through the fluidized bed A so as to heat the same, the reaction temperature may be optimumly controlled and the concentration of gases may be also controlled.

Figure 8:
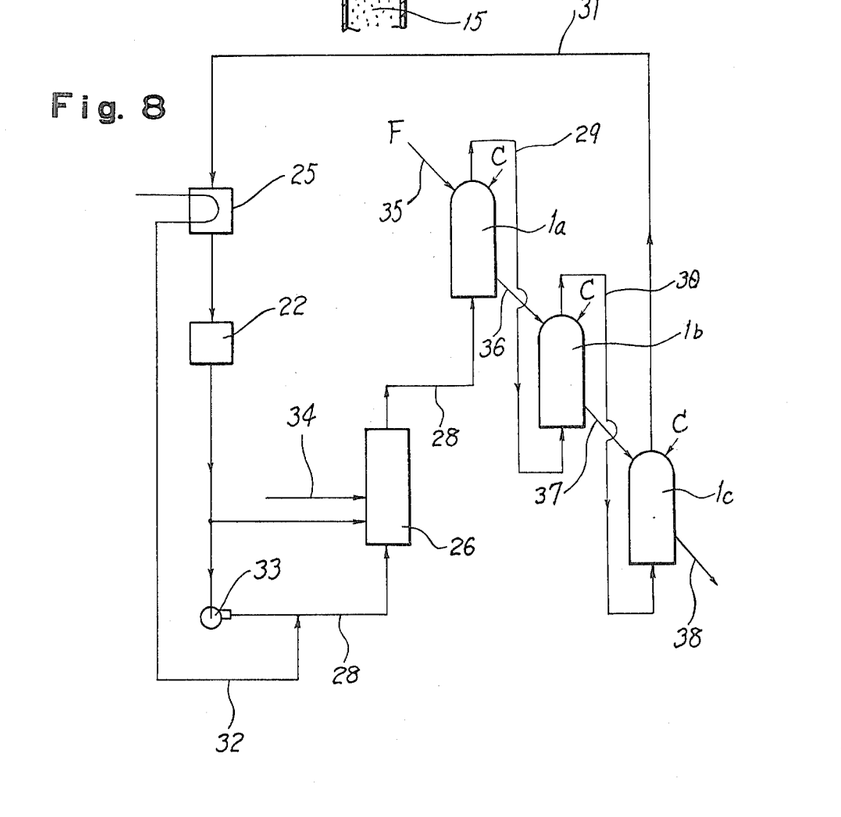
FIG. 8 is a diagrammatic view of a system used for carrying out a third example (embodiment) of the present invention.

THIRD EMBODIMENT, FIG. 8

In the third embodiment shown in FIG. 8, a plurality of reactors are arranged vertically so that the fine ore solids may descend through a plurality of fluidized bed and may be reduced in the manner described above. Instead of cascading a plurality of reactors, a plurality of fluidized bed A may be formed within a single reactor.

Referring to FIG. 8, the reactors 1a, 1b and 1c are all similar in construction to that shown in FIG. 1. They are arranged in the three stages. A gas distribution system 28 is connected to the bottom of the first reactor 1a so that the fluidizing and reducing gas may flow upwardly in it toward the top thereof. The top of the first reactor 1a is communicated through a gas distribution system 29 to the bottom of the second reactor 1b.

The gas flows upwardly in the second reactor 1b to the top thereof. The top of the second reactor 1b is communicated through a gas distribution system 30 with the bottom of the third reactor 1c. The top of the third reactor 1c is connected to a gas discharge system 31 which in turn is connected through a heat exchanger 25 and a scrubber 22 to a preheater 26. The latter is connected through a gas distribution system 28 to the bottom of the first reactor 1a. Thus, the gas circulation system is established. A gas supply system 32 is connected to the system 28 in order to supply a fresh gas. The fresh gas supply system 32 is so arranged as to make the fresh gas pass the heat exchanger 25 so that the heat of the exhaust gases flowing through the system 31 may be transferred to the fresh gas flowing through the system 32.

Reference numeral 33 denotes a blower or a compressor and 34 indicates a fuel system for the preheater 26.

A material charging system 35 is connected to the top of the first reactor 1a so as to charge the fine ore solids F into it. The product outlet is provided at the bottom of the reactor 1a so as to discharge the products or reduced ion ores. A transfer system 36 is disposed between the product outlet and the top of the second reactor 1b. A transfer system 37 similar to the system 36 is also disposed between the second and third reactors 1b and 1c. The bottom of the third reactor 1c is connected to a discharge system 38 for discharging the finished reduced iron ores.

Next the mode of operation with the above multistage fluidized bed system will be described. As is the case of the first embodiment, a fluidized bed of the fine carbon bearing particles is formed within the first, second and third reactors 1a, 1b and 1c each. The fine ore solids F are charged into the first reactor 1a and descend through the fluidized bed so that they are reduced and the reducing gas is produced in the manner described above.

The reduced iron ores descend through the fluidized bed in the reactor 1a and descend from the top of the second reactor 1b. In this case, as in the first reactor 1a, the fine ore solids descend through the fluidized bed and are subjected to the further reduction. The reducing gas is also generated in the second reactor 1b. When the fine ore solids pass through the second reactor 1b and then through the third reactor 1c, they are reduced to their final grade and discharged to the exterior.

Dust separators and means for increasing the pressure of gas which are connected in the gas distribution systems 29 and 30 are not shown. In order to sustain the fluidized bed in the reactors, the gases to be introduced into them must be controlled in pressure. Therefore, in some cases, means for adding the gas and/or breeders (for discharging the gases) must be connected in the gas distribution systems 29 and 30. However, they are not shown in FIG. 8, and their description shall not be made in this specification.

As is the case of the second embodiment, the electrodes may be disposed within the first, second and third reactors 1a, 1b and 1c so as to control the temperature within the reactors and the concentrations of gases therein, thereby controlling the reactions.

As described above, the third embodiment may attain the desired effects of the present invention. Furthermore, since the reduction process is carried out in the multi-stage, the degree of metallization may be remarkably increased.

Figure 9:
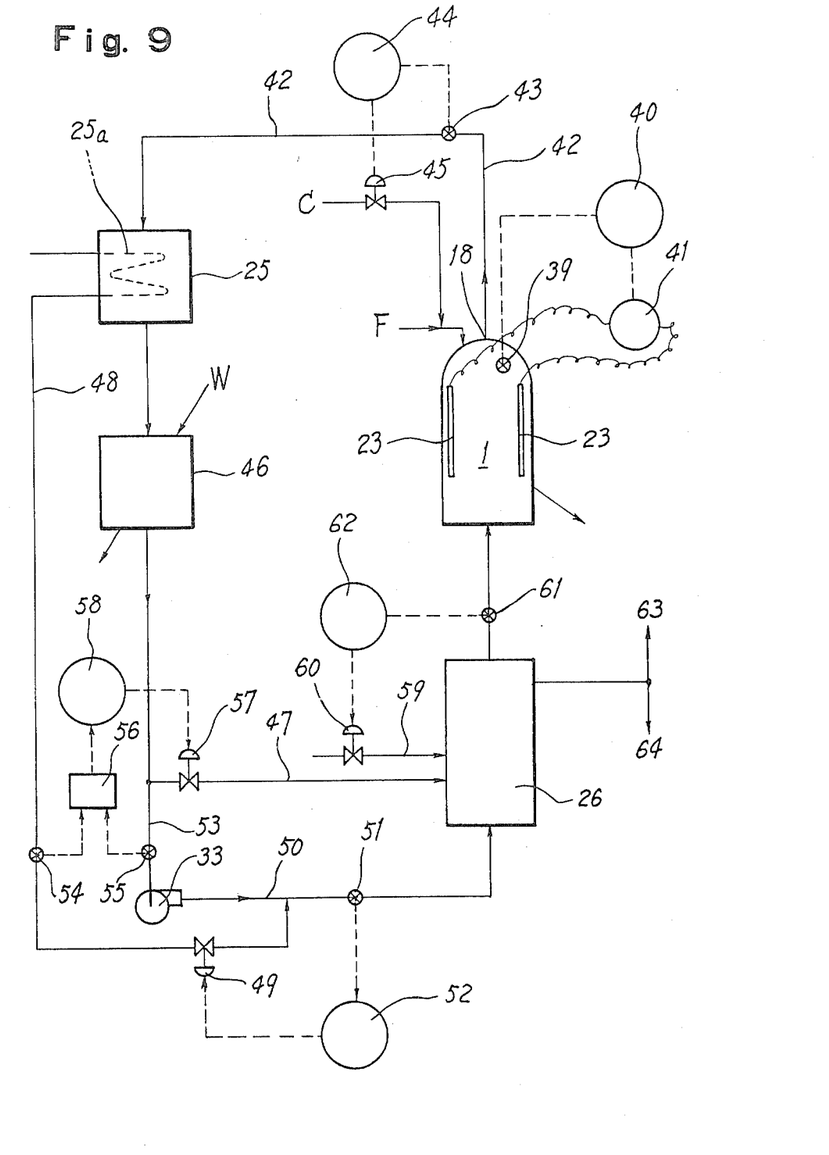
FIG. 9 is a diagrammatic view of a system used for carrying out a fourth example (embodiment) of the present invention.

FOURTH EMBODIMENT, FIG. 9

The fourth embodiment of the present invention is directed to the temperature control within the reactor or reactors used in the first, second or third embodiment.

Referring to FIG. 9, the whole system is fundamentally similar in construction to that shown in FIG. 5.

A temperature sensor 39 is inserted in the reactor 1 and the output signal therefrom is transmitted to a temperature control unit 40. The temperature sensor 39 is selected depending upon the temperature within the reactor 1 and may be a thermocouple, a spectrum analyzer, etc. The temperature sensor 39 is positioned in opposed relationship with the electrode 23. The number of the temperature sensor 39 is not limited to one. Especially when a plurality of temperature sensors 39 are provided, the temperature within the reactor 1 may be controlled in response to the average temperature sensed by them. Furthermore, the malfunction of the temperature control unit 40 due to the breakdown of the temperature sensor 39 may be avoided.

The temperature control unit 40 compares the output signal from the temperature sensor 39 with a reference signal representing an optimum reaction temperature, and generates a difference signal which is transmitted to a voltage control unit 41. In response to the difference signal, the voltage control unit 41 controls the voltage applied between the electrodes 23. It is to be understood that the signal processing by the temperature control unit 40 is not limited to the so-called proportional control which changes the output in proportion to the difference between the output signal from the temperature sensor 39 and the reference signal, but it is preferable that the integral and differential modes may be employed in view of the time delay in error signal and other factors affecting the temperature control.

The type of the voltage control unit 41 is dependent upon whether the voltage applied between the pair of electrodes 23 is DC or AC. In the case of AC, it may be a transformer, a variable resistor, or a phase control unit utilizing a triac or a thyristor.

A gas analyzer or sensor 43 for detecting the contents of the gas exhausted from the top of the reactor 1 is inserted into an exhaust pipe 42. Its output signal is transmitted to a carbon bearing particle charging control unit 44.

In response to the output signal of the sensor 43 representing for example the contents of the carbon monoxide (CO), the carbon particle charging control unit 44 computes the amount of fine carbon bearing particles consumed in the reactor and generates a command signal which is transmitted to a carbon bearing particle supply valve 45. In response to the command signal, the supply valve 45 is opened or closed so as to control the quantity of fine carbon bearing particles (or carbon in the form of powder) to be charged into the reactor 1.

Water W is sprayed against the gas passing through a scrubber 46 so as to remove dust and the like entrained in the gas. Instead of the scrubber 46, a dry type dust collector may be employed.

A line 47 is branched from a line between the scrubber 46 and the blower 33 so that part of the carbon monoxide (CO) in the exhaust gas may be used as the fuel in the preheater 26.

A gas supply valve 49 for supplying a fresh gas so as to control the contents of the gas recirculated is connected to a pipe line 48 connected to the outlet of a coiled tube 25a of the heat exchanger 25.

A gas sensor 51 is connected to the discharge pipe line 50 of the blower 33 and its output signal is transmitted to a gas contents control unit 52. The latter compares the output signal from the gas sensor 51 with a reference signal representative of an optimum contents of a gas for a desired reduction of iron ores and generates an error signal, in response to which the valve 49 is opened or closed to introduce a fresh gas into the gases to be recirculated through the reactor 1. Thus the contents of the gas may be always maintained at an optimum level.

A flow meter 54 is connected to the pipe line 48 and another flow meter 55, to the suction pipe 53 of the blower. The output signals from these flow meters 54 and 55 are transmitted to an adder 56 the output signal of which in turn is transmitted to a main fuel control unit 58 for controlling a main fuel supply valve 57 connected to the pipe line 47.

In response to the output signal of the adder 56, the main fuel control unit 58 detects the whole quantity of gases charged into the preheater 26, and in response to the detected quantity, it generates a command signal which is applied to the supply valve 57 so that the latter is opened or closed, thereby controlling the quantity of the fuel gas to be charged into the preheater 26.

As described above, part of the gas discharged from the reactor 1 is used as the fuel of the preheater 26. In addition, a fuel supply line 59 is provided to supply propane or the like. A control valve 60 is inserted in the fuel supply line 59.

A temperature sensor 61 is inserted into a pipe line extending from the preheater 26 to the reactor 1 and its output signal is transmitted to a temperature control unit 62. The latter compares the output signal from the sensor 61 with a reference signal representative of an optimum or predetermined temperature and generates an error signal, in response to which a supply valve 60 is opened or closed.

Waste gas from the preheater 26 are discharged through a flue 63 or recirculated through a flue 64 in order to control the contents of the gas to be recirculated through the reactor 1.

Next the mode of operation (especially control) with the above system will be described.

In the reactor 1, the following reaction proceeds $$C + \tfrac{1}{2}O_2 \rightarrow CO$$

That is, the reducing gas CO is reproduced and reduces the fine ore solids.

In the following description, the reaction is assumed in the steady state wherein the reducing gas CO is continuously produced within the reactor 1.

In order to maintain such steady state, it is needed to introduce the gas (such as CO, $CO_2$ and so on) at a controlled temperature into the reactor 1.

The sensor 61 detects the temperature of the gases discharged from the preheater 26 and its output signal is transmitted to the temperature control unit 62. The latter compares the output signal with the reference signal representative of a temperature at which the steady state may be maintained. When the detected temperature is low, the command signal is transmitted to the fuel supply valve 60 so as to open it, thereby increasing the combustion of the preheater 26 so as to increase the temperature of the gas to be introduced into the reactor 1.

Thus the gases at a controlled temperature range are always admitted into the reactor 1. However, in order to maintain the optimum reactions within the reactor 1, the temperature of the gases to be admitted thereinto must be controlled in narrower temperature range than that described above.

Therefore the temperature within the reactor 1 is detected by the temperature sensor 39 the output signal of which is transmitted to the temperature control unit 40. The latter compares it with the reference signal representative of an optimum temperature within the reactor 1 and generates an error signal. For instance, when the detected temperature is low, a command signal is transmitted to the voltage control unit 41 so that the voltage to be applied between the pair of electrodes 23 may be increased. As a result, the Joule heat is increased, whereby the temperature in the reactor 1 is raised to a desired temperature.

So far the preheater 26 has been described as a main heater while the pair of electrodes, as an auxiliary heating means, but it is to be understood that when the current passing through the pair of electrodes 23 is increased sufficiently, they may serve as a main heater.

As described above, the fourth embodiment of the present invention may also attain the desired effects thereof. Since the gas to be recirculated through the reactor is preheated and the temperature in the reactor 1 is further controlled by changing the voltage applied between the pair of electrodes 23, the reactor temperature may be maintained in a narrow desired temperature range so that the efficient reduction of iron ores may be accomplished.

Figure 10:
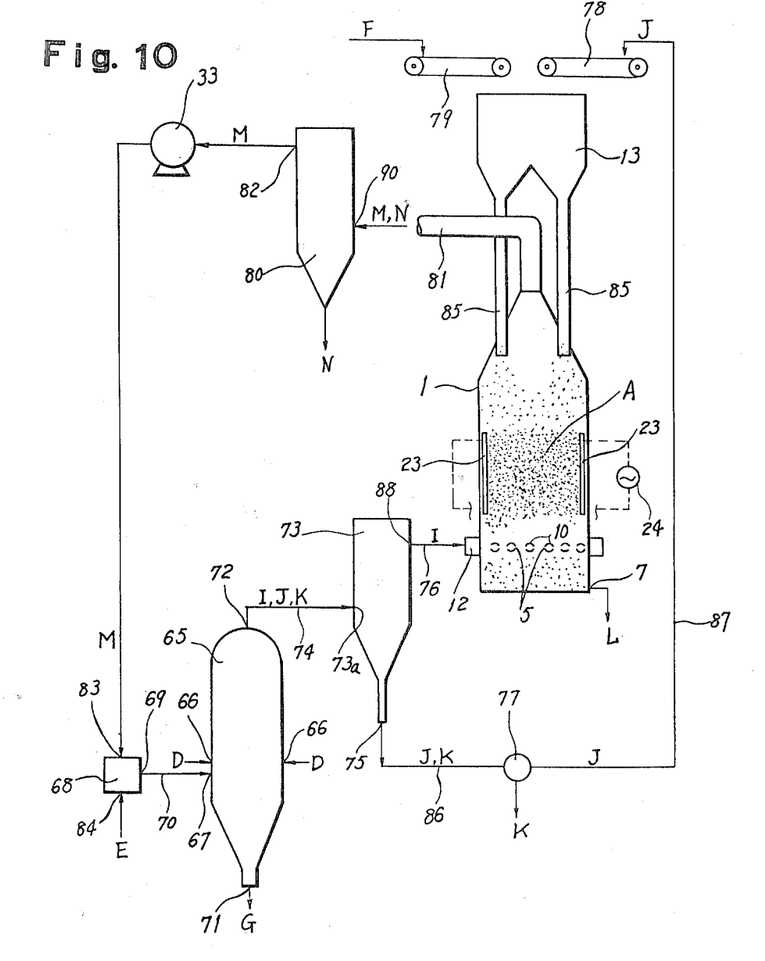
FIG. 10 is a diagrammatic view of a system adapted to carry out a fifth example (embodiment) of the present invention.
Figure 11:
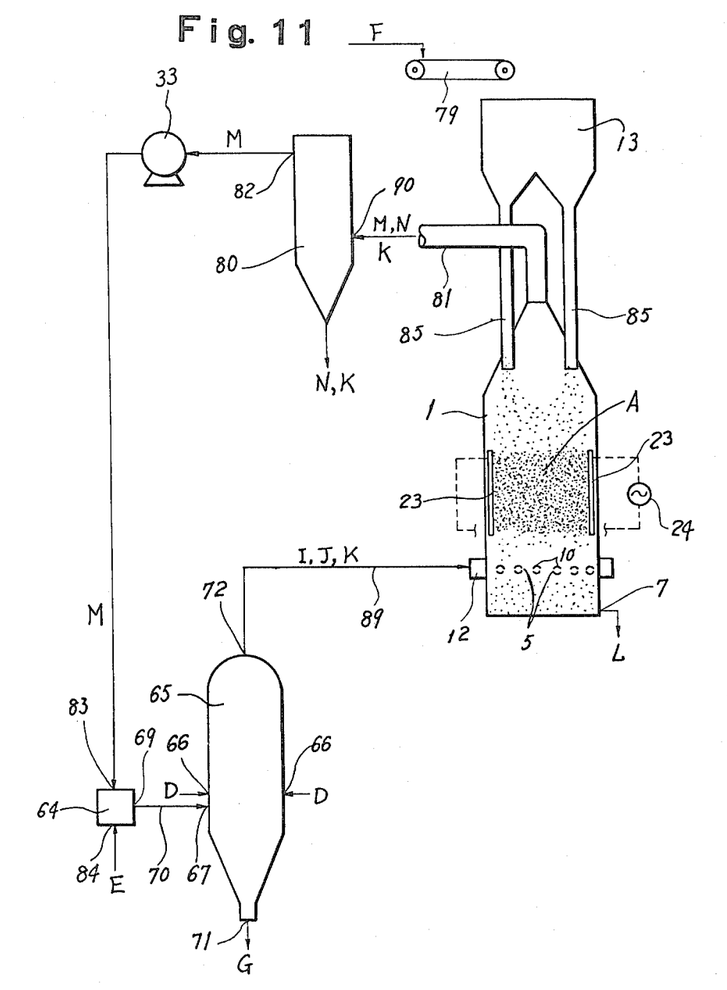
FIG. 11 is a schematic diagrammatic view of a system adapted for carrying out a modification of the fifth example (embodiment).

FIFTH EMBODIMENT, FIGS. 10 and 11

The fifth embodiment of the present invention is directed to a further refinement of the first, second, third or fourth embodiment described above. That is, a gas generator for instance generating gas from coal is installed so as to use the generated gas for agitating the fine carbon particles thereby forming the fluidized bed. Furthermore, carbon substances which are also produced in the gas generator may be used as the fine carbon particles to form the fluidized bed.

Referring to FIG. 10, the whole system is fundamentally similar to that shown in FIG. 6 (or FIG. 2). Reference numeral 65 denotes a coal gas generator and 66 indicates a coal charging inlet. The gas inlet 67 of the gas generator 65 is communicated with the outlet 69 of a gas mixing apparatus 68 in the preceding stage through a pipe line 70. Therefore, the coal D is partially burned with the air or oxygen E in the gas generator 65. Tar G produced by the partial combustion of the coal D is discharged through a tar outlet 71 at the bottom of the gas generator 65 while the gas I, char J and ash K are introduced through a pipe line 74 into a gas separator 73. (Reference numeral 73a denotes an inlet thereof). The gas separator 73 separates the gas I from the char J and the ash K.

The gas separator 73 is communicated through a pipe line 76 with the annular pipe 12 of the reactor 1. The char and ash outlet 75 of the gas separator 73 is connected through a pipe line 86, an ash separator 77 and a pipe line 87 to a carbon particle conveyor 78 above the reactor 1. Reference numeral 79 denotes a fine ore solid conveyor.

Reference numeral 80 indicates a dust collector connected to an exhaust duct 81 extended from the top of the reactor 1. The dust collector 80 also functions as a cooler. The gas outlet 82 of the dust collector 80 (reference numeral 90 being an exhaust gas inlet) is communicated through a blower 33 with the exhaust gas inlet 83 of the gas mixing apparatus 68. Symbol M denotes the exhaust gas (top gas) and N, dust.

Next the direct reduction process for the ion ores with the system described above will be described hereinafter. (The description is mainly directed to the method for producing gases from the coal.) First, coal D of predetermined particle sizes (the sizes being selected depending upon the desired particle sizes of the char J which form the fluidized bed A) is charged into the gas generator 65. The air or oxygen E is introduced through the inlet 84 into the gas mixing apparatus 68 and into the gas generator 65 so as to effect the partial combustion of coal particles D. As a result, the high temperature gases I containing CO, $CO_2$, $H_2$ and $H_2O$, char J, ash K and tar G are produced. The tar G is discharged out of the system through the tar outlet 71.

The gas I, the char J and the ash K are admitted through the outlet 72 and the pipe line 74 into the gas separator 73 through its inlet 73a. With the gas separator 73, the gas I is separated from the char J and ash K. Only the gas I thus separated is distributed into the reactor 1 through the gas outlet 88, the pipe line 76, the annular pipe 12, the gas distribution pipes 10 and their gas distribution holes 5. The char J and ash K are discharged from the gas separator and admitted into the ash separator 77 through the pipe line 86. In the ash separator 77, the char J is separated from the ash K and is transported through the feed line 87 onto the conveyor 78. The char J is charged into the reactor 1 through the hopper 13 and feed pipes 85.

The char J thus charged into the reactor 1 is caused to float because of the upflow of the gas I (containing CO, $CO_2$, $H_2$ and $H_2O$) and the weight of the char J itself, whereby the fluidized bed A is formed.

Under these conditions, as is the case of the second embodiment, the voltage is applied between the electrodes 23 so that the current is made to pass the fluidized bed A of the char J so that the reactor temperature is raised to or maintained at a predetermined level.

In this case, the carbon dioxide $CO_2$ in the gas I reacts with the char J to produce the carbon monoxide CO.

$$C + CO_2 \rightarrow 2CO$$

As a result, as is the case of the first or second embodiment, the fluidized bed A is suspended in the reducing atmosphere containing carbon monoxide CO and hydrogen H.

When the fine ore solids F are charged into the reactor 1 under these conditions, as is the case of the first or second embodiment, the reduction reactions and the atmosphere producing reactions proceed, whereby the iron ores are reduced. Symbol L denotes reduced iron ores.

In the system shown in FIG. 11, the outlet 72 of the gas generator 65 is directly connected through the pipe line 89 to the annular pipe 12. That is, the gas separator, the ash separator and the char conveyor are eliminated.

Therefore, in the system shown in FIG. 11, the gas I, char J and ash K are all directly charged into the reactor 1 and the fluidized bed A of the char J is formed. The other processes are similar to those when the system shown in FIG. 10 is used so that no description shall be made in this specification.

In the fifth embodiment, the partial combustion of coal D is effected to utilize the gases and char produced, but it is to be understood that coal may be subjected to the carbonization process so that the gas and char produced are utilized in the manner described above. Furthermore the reducing gas may be produced from other hydrocarbons.

The fifth embodiment may be used not only in combination with the first or second embodiment but also in combination of the third or fourth embodiment.

Thus, the fifth embodiment may attain the desired effects of the present invention.

Since the char (or coke) produced by the partial combustion of coal is used as the substance (carbon compounds) for forming the fluidized bed, the following effects may be also attained. That is, the variation in specific gravity as well as the size of char due to the evaporation of volatile matters during the reactions may be minimized. As a result, the carbon compounds may maintain a predetermined specific gravity and size for a long time interval and the qualities are uniform. The deterioration and fatigue are minimized and consequently the lifetime may be increased. Thus the stable floating layer may be maintained so that the formation, maintenance and control of the fluidized bed may be much facilitated. Since the fluidized bed forming substance may maintain predetermined qualities or properties as described above and the stable fluidized bed may be formed, the separation of the reduced iron ores from the fluidized bed forming substances may be satisfactorily and positively made due to the difference in specific gravity and size between the fluidized bed forming substances and the reduced or metallized iron ores.

As described above, according to the direct reduction process for the iron ores in accordance with the present invention, the fine carbon bearing particles are admitted into the gaseous atmosphere which is heated and formed into the fluidized bed, and the fine ore solids are made to descend through the fluidized bed formed. Thus, the iron ores are reduced at least by the fine carbon bearing particles of the fluidized bed and the atmosphere containing the carbon monoxide while the carbon dioxide produced by the reactions is caused to react with carbon compounds so that the reducing atmosphere containing the carbon monoxide is produced. As a result, the following effects and advantages hitherto unattainable by the prior art processes may be obtained.

Opposed to the prior art direct reduction processes, according to the present invention, the process for producing the reducing gas and the process for reducing the iron ores proceed simultaneously in the reactor. Furthermore, the reduction efficiency or reducibility may be remarkably improved and the cost for direct-reduction of the iron ores may be considerably reduced.

In addition to the reactions for reducing the iron ores, the reducing atmosphere may be continuously or intermittently produced so that the apparatus for generating the reducing gas may be eliminated. As a result, the capital or installation cost of the direct reduction system may be lowered so that the present invention may attain enormous economical advantages in addition to the technical ones.

Since the fine carbon bearing particles or their equivalent are made to float in the reducing gas or atmosphere, the agglomeration under pressure of the reduced iron ores and sintering thereof may be avoided during the reactions.

Furthermore, while the solid reactants or the fine carbon bearing particles are floating in the reactor, the reduced iron ores are discharged or extracted so that the reduced iron ores may be automatically selected and extracted by utilizing the difference in specific gravity and size between them.

What is claimed is:
1. A fluidized bed type direct reduction process for iron ores comprising the steps of:
   forming a fluidized bed of fine carbon bearing particles within a heated gaseous reducing atmosphere in a reactor,
   causing fine iron ore solids to descend through said fluidized bed of carbon bearing particles to thereby reduce said fine iron ore solids by said reducing atmosphere containing the carbon monoxide and the fine carbon bearing particles of said fluidized bed while self-producing said reducing atmosphere containing at least carbon and carbon monoxide, and removing said fine iron ore solids after reduction from beneath said fluidized bed.

2. A fluidized bed type process as defined in claim 1, wherein said step of heating said gaseous atmosphere comprises the energization of electrodes disposed within the reactor.

3. A fluidized bed type process as defined in claim 1, further comprising the step of cascading a plurality of reactors in multi-stage, and passing said fine iron ore solids sequentially through said cascaded reactors.

4. A fluidized bed type process as defined in claim 1, further comprising the step of controlling the reactor temperature.

5. A fluidized bed type process as defined in claim 1, further comprising supplying said reducing gas from a reducing gas generator for creating and sustaining said fluidized bed and for supplying said fine carbon particles from carbon compounds produced in said reducing gas generator.

6. A fluidized bed type process as defined in claim 1, wherein said heated gaseous reducing atmosphere is formed by supplying at least one gas selected from the group consisting of air, oxygen, nitrogen, carbon monoxide, hydrogen and methane to said reactor.

7. A fluidized bed type process as defined in claim 1, further comprising the step of recirculating said heated gaseous atmosphere in the reactor from the top of said reactor to the bottom of said reactor for creating and sustaining said fluidized bed.

8. A fluidized bed type process as defined in claim 2, further comprising the step of controlling the energization of the electrodes disposed within the reactor to control the temperature of the heated gaseous atmosphere therein.

9. A fluidized bed type process as defined in claim 7, further comprising the step of removing steam contained within said recirculated gas prior to readmission into the bottom of said reactor.

* * * * *